United States Patent [19]

Berky

[11] 4,229,934
[45] Oct. 28, 1980

[54] BALE ROLLING MACHINE

[75] Inventor: Richard K. Berky, Cedar Falls, Iowa

[73] Assignee: Chromalloy American Corporation, New York, N.Y.

[21] Appl. No.: 29,722

[22] Filed: Apr. 13, 1979

[51] Int. Cl.³ .......................................... A01D 37/00
[52] U.S. Cl. ...................................... 56/341; 100/88
[58] Field of Search ............................... 56/341–344; 100/88

[56] References Cited

U.S. PATENT DOCUMENTS

| | | | |
|---|---|---|---|
| 3,110,145 | 11/1963 | Avery | 56/341 |
| 3,534,537 | 10/1970 | Buchele et al. | 56/341 |
| 3,691,741 | 9/1972 | White et al. | 56/344 |
| 3,722,197 | 3/1973 | Vermeer | 100/88 |
| 3,837,159 | 9/1974 | Vermeer | 56/341 |
| 3,895,573 | 7/1975 | Phillips et al. | 100/88 |
| 3,901,007 | 8/1975 | Blanshine et al. | 56/341 |
| 4,103,475 | 8/1978 | Kampman et al. | 56/341 |
| 4,121,513 | 10/1978 | Kopaska | 100/88 |

*Primary Examiner*—Paul J. Hirsch
*Attorney, Agent, or Firm*—Wegner, Stellman, McCord, Wiles & Wood

[57] ABSTRACT

Apparatus for rolling large bales of fodder has a frame with a floor that supports a working run of fodder conveying chains trained around front and rear sprockets, and fodder pickup means is coaxial with the front sprockets and feeds fodder onto the conveying chains. Endless baling chains are connected by raddles that extend transversely above the floor, with the chains carried on sprockets except in a baling run above the floor where the ends of the raddles are supported on large rotatable discs at the sides of the frame. Rearward sprockets for the baling raddle chains are carried on a rear gate that has an upright baling position; and hydraulic cylinder means swings the gate upwardly and readwardly to release a bale. In baling position the floor is tilted forwardly, and a hitch for the apparatus has rear and front transverse pivots about which it is pivoted by hydraulic cylinder means to swing the frame to a discharge position in which the floor is tilted rearwardly. A gear box mounted in the rear of the hitch has a transverse output shaft, coaxial with the rear transverse pivot, from which the conveyor chains, pickup, and baling chains are driven off the tractor power takeoff.

25 Claims, 8 Drawing Figures

BALE ROLLING MACHINE

BACKGROUND OF THE INVENTION

Since about the early 1960's considerable work has been done toward developing machines which will roll large bales of hay or other fodder, containing from about 1,000 pounds (about 450 kgs) to about 1,200 pounds (about 550 kgs). Such a bale is about 5 feet (1.5 m) in length and diameter. The first such machine was disclosed in Avery U.S. Pat. No. 3,110,145, which rolls such bales in contact with the ground.

More recent developments have taken the form of balers which have a frame with a floor provided with fodder conveyor chains or belts, with a conventional fodder pickup head at the front of the frame to feed fodder off the ground onto the conveyor. Fodder moved rearwardly by the conveyor is picked up by a forwardly moving run of bale rolling chains with cross raddles which are above the floor, with the baling raddle chains biased to minimize the length of the baling run which can expand as a bale increases in size. In principle, such balers are like an Avery baler, rolling the bale on a floor conveyor instead of on the ground. Typical of such balers is the one disclosed in Blanshine et al. U.S. Pat. No. 3,901,007.

Initially it was believed desirable to roll such bales as densely as possible, both to get the largest quantity of fodder into a bale of given size and to make the bale as weatherproof as possible. More recently it has been learned that such bales should have a relatively loose core for air circulation with a more densely packed peripheral portion to shed water and also provide the bale with a relatively rigid outer shell. Apparatus for rolling a "soft core" bale is disclosed in Kampman et al. U.S. Pat. No. 4,103,475.

SUMMARY OF THE INVENTION

The present invention provides a baler of the general type disclosed in Blanshine et al. U.S. Pat. No. 3,901,007, and provided with baling raddle chain guides like those of Kampman et al. Pat. No. 4,103,475.

The baler is provided with a unique fodder pickup arrangement in which the floor of the baler is tilted forward during baling and has a fodder pickup means which is coaxial with the front sprocket of the fodder conveyor on the floor of the baler. This provides for positive pickup of fodder with no loss of fodder between the pickup means and the fodder conveyor means. Prior art balers of the same general type have employed a separate fodder pickup reel which feeds onto independent fodder conveyor chains, and there is a chance for loss of fodder between the pickup reel and the conveyor chains.

The forwardly tilted floor tends to hold the forming bale forward in the baling chamber and seems to provide a better wrap than is achieved with balers having a generally horizontal floor as well as substantially reducing fodder losses at the rear.

When a bale is to be unloaded, the floor is tilted rearwardly about a transverse pivot axis, preferably enough to materially reduce the distance a bale drops during discharge, and thus reduces bale damage. A preferred way to accomplish this is with a hitch means at the front of the baler frame which consists of a draw bar mounted on a rearward transverse pivot at the front of the baler frame, a pintle yoke connected to the front of the draw bar on a forward transverse pivot, and hydraulic cylinder and piston means connected between the draw bar and the front of the baler frame to pivot the baler frame upwardly and rearwardly relative to the draw bar, while the draw bar pivots upwardly relative to the pintle yoke.

If the bale is to be wrapped, the baler may be moved first to an intermediate position in which the floor is approximately horizontal.

The fodder conveyor chains and the baling raddle chains are driven through a gear box at the rear of the hitch which receives power from the tractor power takeoff through two slip tubes which are connected in tandem by means of a universal joint. A four-bar linkage consisting of the draw bar, the pintle yoke, a first link pivoted on the draw bar and on one of the slip tubes near the universal joint, and a second link pivoted on the first link and on the pintle yoke, controls the position of the slip tubes and universal joints relative to the draw bar and one another throughout bale forming, bale wrapping if used, and bale unloading.

The present type of baler requires that the baling raddle chains be capable of expansion as a bale is formed, and this requires resilient means biasing the baling raddle chains toward a position in which the baling run of the chains is of minimum length. As the bale increases in size, the baling run of the baling raddle chains must lengthen, which requires that the rest of the run of the chains must shorten. The present apparatus achieves this with a unique arrangement consisting of a pair of journal blocks slidably mounted in guide channels at the sides of the baler frame, and carrying chain take-up idler sprockets about which the baling raddle chains are back-wrapped between two forward sprockets in a deep U-shaped configuration. Spring means urges the journal blocks in a direction to maximize the distance traversed by the chains between the two fixed sprockets, thus minimizing the length of the working run of the chains. The expansion of the bale increases the length of the working run of the chains which necessitates a corresponding decrease in the length of the chains between the fixed sprockets and about the sprockets in the journal blocks, so the journal blocks move along the guide channels against the force exerted by the spring, and the chains approach a straight line configuration between the forward sprockets. This produces a rapidly accelerating increase in chain tension, and thus in raddle pressure on the bale, causing improved thatching or felting of the outermost bale layers. In order that the baling raddle chains may back-wrap around the take-up sprockets, those sprockets are provided with radial recesses in which the raddles are received.

Nesting the biasing springs inside the frame members on the line of travel of the journal blocks minimizes overhung load and cocking moments on the journal blocks. Frame width is minimized; the "stored" chain configuration is compact; and as the take-up sprockets rise the upper forward part of the bale may project into the original raddle chain storage area.

DETAILED DESCRIPTION OF THE INVENTION

Figure 1:
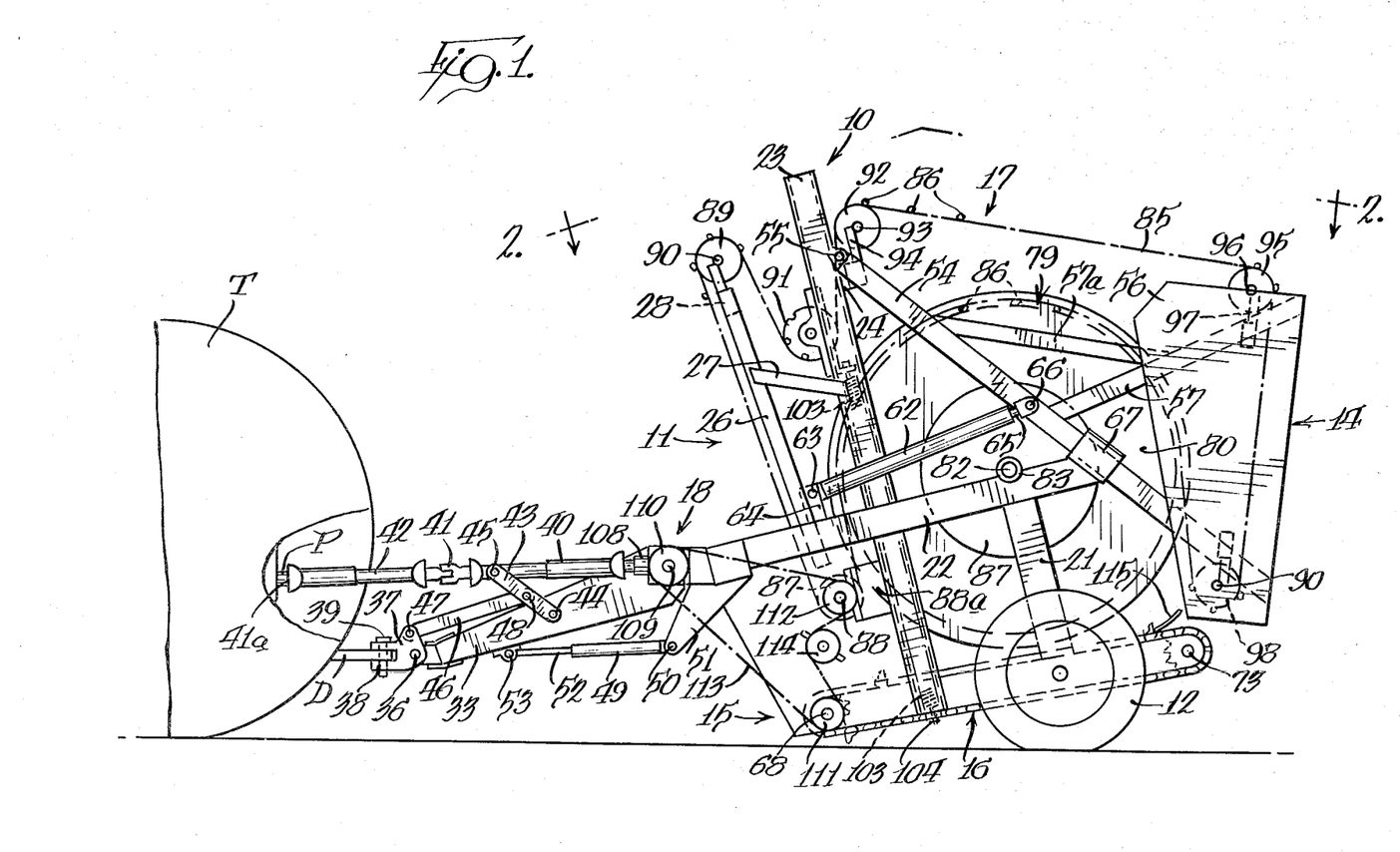
FIG. 1 is a side elevational view of the apparatus of the invention in baling position, with the drive for the pickup, the fodder conveyor chains and the baling raddle chains illustrated somewhat diagrammatically.
Figure 2:
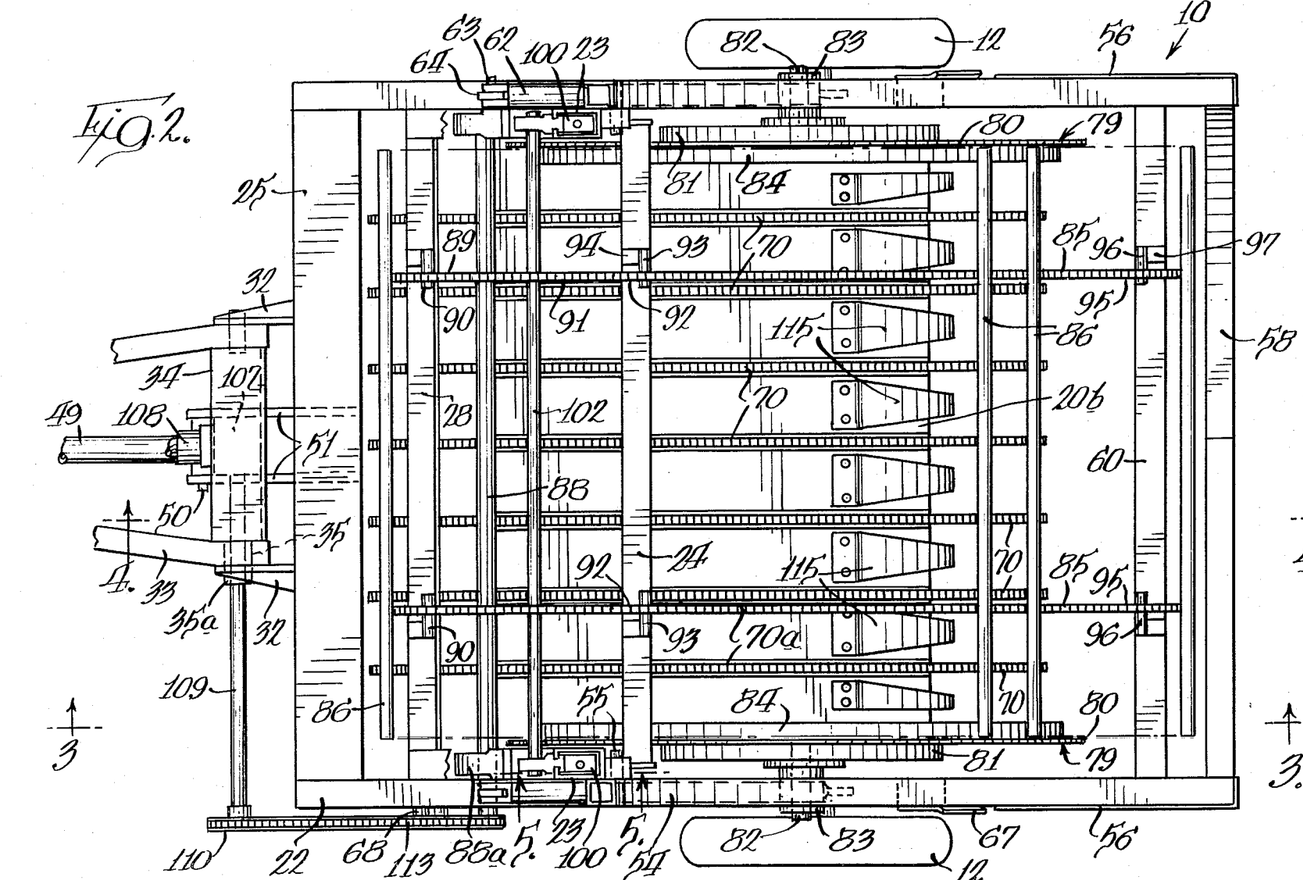
FIG. 2 is a horizontal sectional view on an enlarged scale, with parts broken away, taken substantially as indicated along the line 2—2 of FIG. 1.
Figure 4:
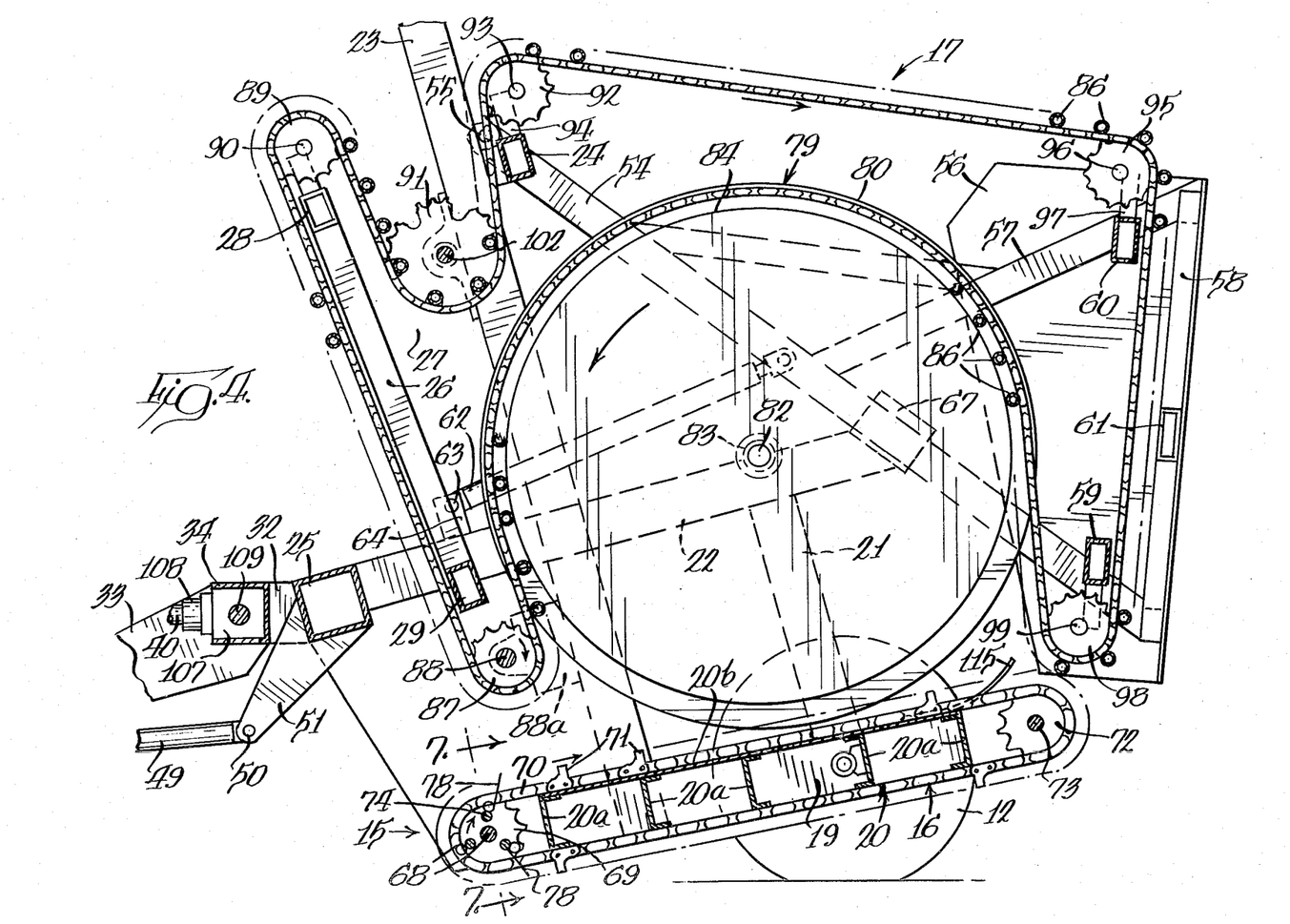
FIG. 4 is a longitudinal sectional view taken substantially as indicated along the line 4—4 of FIG. 2.
Figure 5:
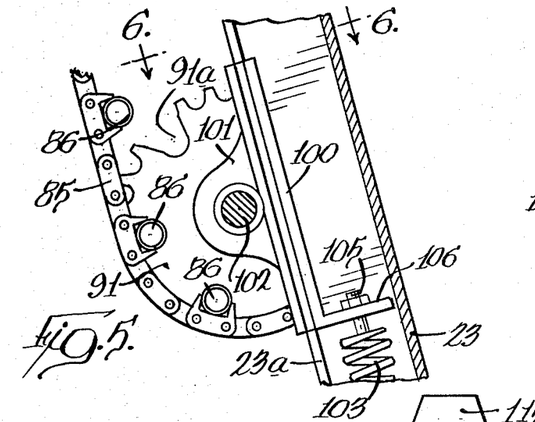
FIG. 5 is a fragmentary sectional view on an enlarged scale taken substantially as indicated along the line 5—5 of FIG. 2.

Referring to the drawings in detail, and referring first to FIGS. 1, 2 and 4, the apparatus of the present invention, indicated generally at 10, has principal components which include a frame, indicated generally at 11, which is supported upon wheels 12; hitch means, indicated generally at 13; bale release means, indicated generally at 14; fodder pickup means, indicated generally at 15; fodder conveying means, indicated generally at 16; bale rolling means, indicated generally at 17; and drive means, indicated generally at 18. The apparatus is constructed to be drawn behind a farm tractor T by attachment of the hitch means 13 to a tractor draw bar D, and to be driven by operatively connecting the drive means 18 to a tractor PTO, P.

The frame 11 consists of parallel, lower side frame members 19 (FIG. 3), main upright side beams 21 welded to the lower side frame members 19 and surmounted by longitudinal beams 22 toward the forward part of which are upright guide channel beams 23 the lower ends of which are welded to the lower side frame members 19 and which are welded intermediate their ends to the longitudinal beams 22. Upper cross beams 24 connect the upper ends of the guide channel beams 23. At the extreme forward ends of the longitudinal beams 22 is a large transverse box beam 25 which forms the front of the frame. Near the front of the frame are front sprocket supporting posts 26 the lower ends of which are welded to the longitudinal beams 22 and which are connected to the guide channel beams 23 by braces 27. An upper cross box 28 and a lower cross box 29 connect the sprocket posts 26. The lower side beams 19, the upright main beams 21 and the longitudinal beams 22 are sheathed by side plates 30 and 31. Hitch brackets 32 extend forwardly from the front beam 25. A floor, indicated generally at 20, consists of a plurality of transversely extending channel members 20a and a floor plate 20b welded onto the channel members (FIG. 4). The floor is supported upon the lower side frame members 19, preferably by welding the channel members 20a thereto.

The hitch means 13 consists of a draw bar 33 the rear end portion of which is positioned between the hitch brackets 32 and has a channel 34 which is pivoted in the brackets on a tubular rearward pivot 35 one end 35a of which is seen in FIG. 2 to extend through the left-hand bracket 32. A forward transverse pivot 36 mounts a pintle yoke 37 the forward end of which is bifurcated at 38 to receive the tractor draw bar D and be secured thereto by a pintle 39.

Directly associated with the hitch means 13 is a slip tube 40 which is connected in tandem through a universal joint 41 with a slip tube 42 which is drivingly connected to the tractor power takeoff P through another universal joint 41a to provide the power input for the drive means 18. The slip tube 40 is supported upon the hitch means 13 by a first link 43 which is pivoted at 44 to the draw bar 33 and at 45 to the slip tube immediately adjacent the universal joint 41. A second link 46 has its forward end pivoted at 47 to the pintle yoke 37, and is pivotally connected at 48 intermediate the ends of the first link 43. Thus, the draw bar 33, the pintle yoke 37, the first link 43 and the second link 46 function as a four-bar linkage which controls the position of the slip tubes 40 and 42 with reference to the hitch means 13 as the apparatus is moved between the baling position of FIG. 1 and the discharge position of FIG. 3.

Also directly and operatively associated with the hitch means 13 is a hydraulic cylinder 49 which is pivotally mounted at 50 upon parallel arms 51 which are secured to the frame front beam 25, and a piston rod 52 is pivotally connected at 53 to the underside of the draw bar 33. Thus, retraction of the piston rod 52 to the position seen in FIG. 3 pivots the frame 11 and the hitch means 13 about the rear transverse pivot 35 so as to tilt the frame about the axis of the ground wheels 12 from the baling position of FIG. 1 to the bale discharge position of FIG. 3.

Figure 3:
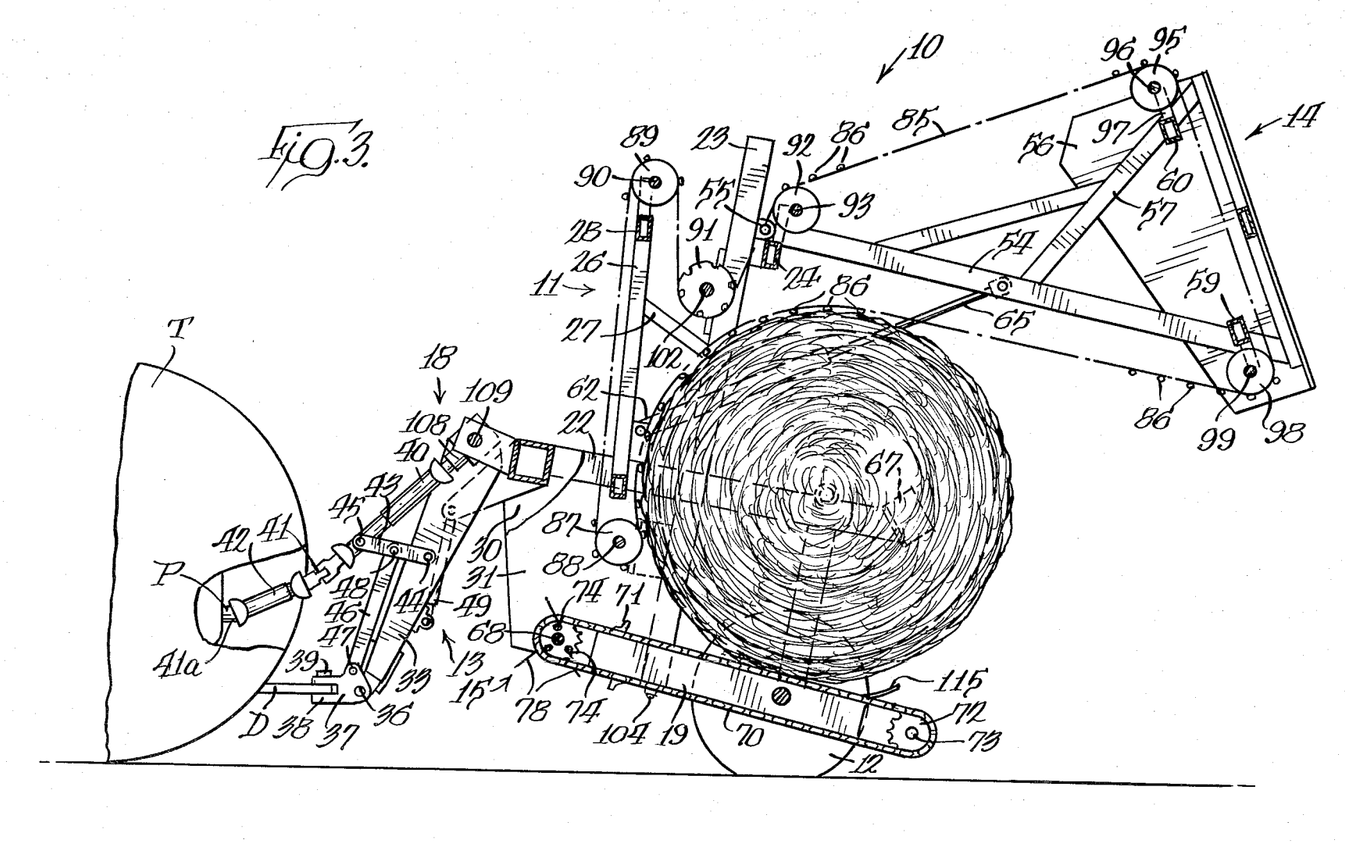
FIG. 3 is a vertical sectional view on the same scale as FIG. 1, taken substantially as indicated along the line 3—3 of FIG. 2, illustrating the apparatus in bale discharging position.

The discharge gate means 14 is best seen in FIGS. 1, 3 and 4 to consist of a pair of gate side beams 54 which are pivotally mounted at 55 on brackets on the upper cross brace 24, gate rear side plates 56 which are welded to the free ends of the gate side beams 54 and to diagonal gate brace members 57, upright back angle members 58 on the plates 56, a cross beam 59 connecting the gate side beams 54, a box cross beam 60 connecting the brace bars 57, and a box cross beam 61 connecting the rear angles 58. A diagonal members 57a extends between the beam 54 and the brace 57. A pair of coordinately operating hydraulic cylinders 62 are pivoted at 63 on bracket 64 at the front of the frame 11, and the cylinders 62 have piston rods 65 pivotally connected at 66 to the gate side beams 54. Thus, extension of the piston rods 65 moves the gate 14 between the baling position of FIG. 1 in which the gate side beams 54 are supported in jaws 67 on the rear of the frame longitudinal beams 22, and the bale discharge position of FIG. 3 in which the gate is swung rearwardly and upwardly about its pivot 55.

Figure 7:
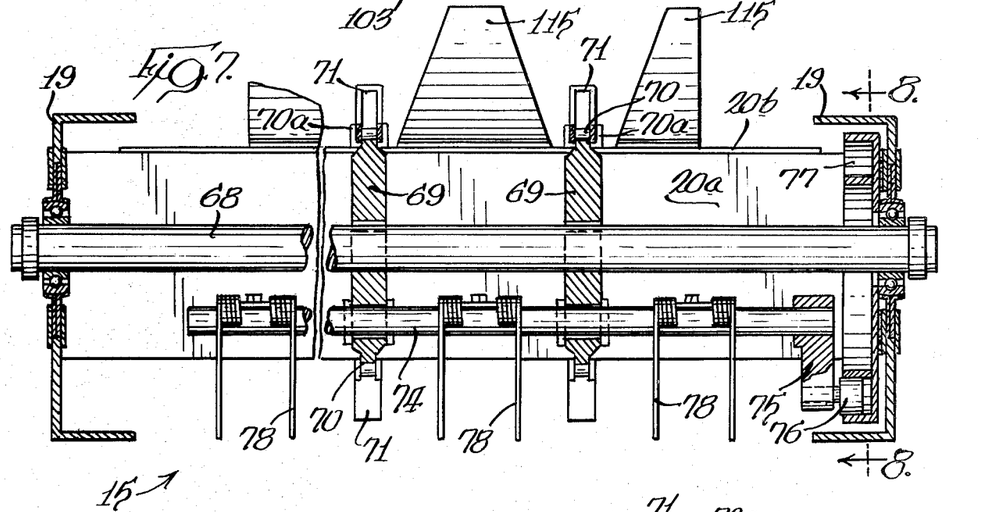
FIG. 7 is a fragmentary sectional view on an enlarged scale taken substantially as indicated along the line 7—7 of FIG. 4.
Figure 8:
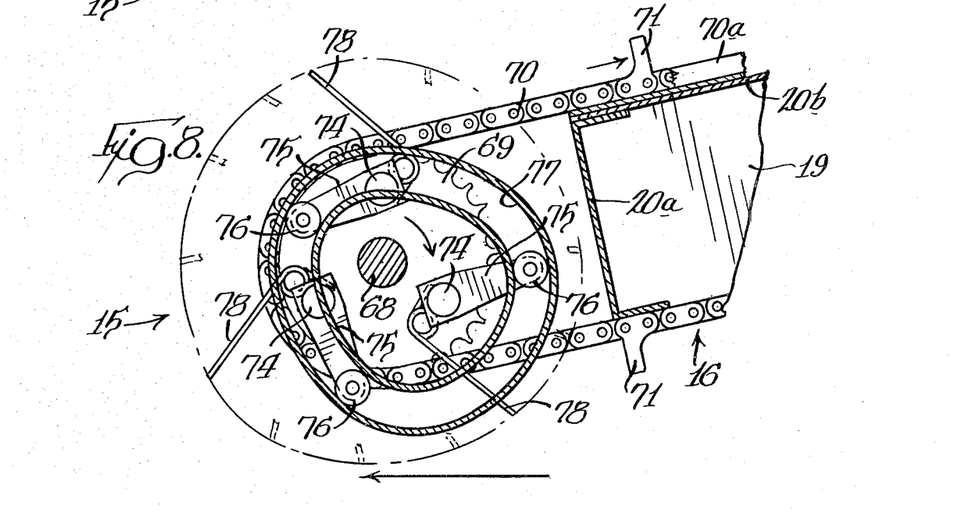
FIG. 8 is a sectional view taken substantially as indicated along the line 8—8 of FIG. 7.

As best seen in FIGS. 4, 7 and 8, the fodder pickup means 15 and fodder conveying means 16 have a common drive shaft 68 on which are mounted seven sprockets 69 that carry fodder conveyor chains 70 upon which are fodder engaging lugs 71. The chains 70 also pass around rear idler sprockets 72 which are journalled upon a shaft 73.

Journalled in the sprockets 69 are three fodder pickup bars 74 at an outer end of each of which is a crank arm 75 which carries a cam follower roller 76 that rides in an eccentric box cam track 77. Fodder pickup tines 78 mounted upon the pickup rods 74 are caused by the action of the cam 77 and cam follower 76 to be extended outwardly as they traverse the lower and forward part of their paths of travel, and to be retracted as they pass through the working run of the fodder conveyor chains 70 which ride upon the floor plate 20b.

The bale rolling means 17 includes rotating raddle guide discs, indicated generally at 79, which have planar side plates 80 provided with outer bosses 81 which have spindles 82 carried in journals 83 on the frame 11. On the inner faces of the plates 80 are annular raddle supporting flanges 84.

The baling means 17 also includes a pair of endless baling raddle chains 85 which carry transverse raddles 86. The raddle chains 85 are trained around drive sprockets 87 upon a drive shaft 88 which is carried upon brackets 88a toward the lower end of the guide channels 23; upon front upper sprockets 89 which are journalled upon shafts 90 at the upper ends of the sprocket arms 26; are back-wrapped around tensioning sprockets 91 which will be described more fully hereinafter; are then trained around sprockets 92 which are journalled on shafts 93 in brackets 94 at the upper ends of the channel guide means 23; thence around upper gate sprockets 95 journalled at 96 upon brackets 97 at the upper ends of the gate side plates 56; thence around lower gate sprockets 98 journalled at 99 on brackets at the lower ends of the gate side plates 56; and thence are guided over the raddle guides 79 the annular flanges 84 of which support the outer extremities of the raddles 86 as seen in FIG. 2. Thus, when the apparatus is in baling position a baling chamber is defined by the floor plate 20b and fodder conveyor chains 70, the rotating raddle guides 79, and a baling run of the baling raddle chains 85 which extends from the rear lower gate sprockets 98 over the rolling raddle guides 79 and downwardly to the drive sprockets 87.

Figure 6:
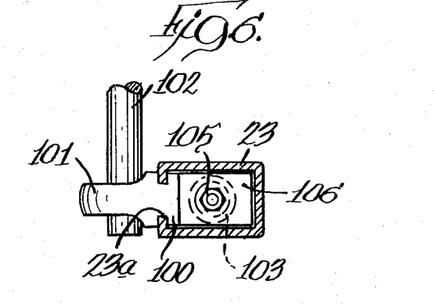
FIG. 6 is a fragmentary sectional view taken substantially as indicated along the line 6—6 of FIG. 5.

Referring now particularly to FIGS. 2 and 4–6, baling raddle chain tensioning means which includes the tensioning sprockets 91 also includes the channel guide beams 23 which are best seen in FIG. 6 to be of box form with an opening 23a along one side; and journal blocks 100 are mounted for sliding movement in the channel guide beams 23 with bearing bosses 101 projecting through the slots 23a to rotatably receive a cross shaft 102 upon which the tensioning sprockets 91 are mounted. Tension springs 103 are carried in the channel guide beams 23, have their lower ends anchored at 104 on the lower frame side plates 19, and have their upper ends connected at 105 to flanges 106 on the lower ends of the journal blocks 100. Thus, the tension springs 103 constantly bias the tensioning sprockets 91 in a direction to minimize the length of the baling run of the baling raddle chains 85. Because the chains 85 are back-wrapped around the tensioning sprockets 91, those sprockets have radial recesses 91a in which the raddles 86 are received as the chain 85 passes around the tensioning sprockets 91.

Referring again primarily to FIGS. 1 and 2, the drive means 18 includes a gear box 107 which is centrally positioned in the channel 34 at the rear of the draw bar 33 and has a forwardly extending input shaft 108 which is operatively connected to the rear slip tube 40 through a third universal joint 41b. The gear box 107 has an output shaft 109 which extends axially through the hollow rear transverse pivot 35 and out the projecting left-hand end 35a of said pivot. A sprocket 110 on the outer end of the shaft 109 is coplanar with a drive sprocket 111 on the end of the fodder pickup and conveyor drive shaft 68, and also with a drive sprocket 112 which is on the shaft 88 for the baling raddle chain drive sprocket 87. A drive chain 113 is trained around the sprockets 110, 111 and 112, and an adjustable tensioning sprocket 114 mounted in the side plate 30 maintains proper driving tension upon the chain 113. Thus, when the apparatus is connected to a tractor T the tractor power takeoff drives the gears in the gear box 107; and the gear box, its output shaft 109 and the sprockets 110, 111 and 112 provide drive means for the fodder pickup means 15, for the fodder conveyor 16, and for the baling raddle chains 85 of the baling means 17.

In operation, the baling apparatus is towed along a windrow of fodder by a farm tractor T with the tractor power takeoff P driving the fodder pickup means 15, the fodder conveyor means 16 and the chains of the bale rolling means 17. The fodder pickup tines 78 lift the material in the windrow onto the floor plate 20b and the chains 70, each of which is guided in a channel member 70a on the floor plate. At the rear of the floor plate, upwardly curved spring plates 115 guide the rearwardly moving fodder upwardly into the reach of the baling raddles 86 which function to roll the stream of fodder forwardly upon itself into a spiral bale which is confined between the rotating raddle guides 79. When the forming bale becomes large enough to be in contact with the raddles where they pass over the top of the rolling raddle guide flanges 84, the pressure of the forming roll begins to lift the chains 85 off the raddle guide flanges 84, thus compressing the fodder in the bale. For this to occur, of course, the journal blocks 100 must move upwardly in the channel guide means 23 against the bias of the springs 103 so as to decrease the length of the chain run between the sprockets 89 and 92, increase the raddle pressure in the forming bale, and increase the length of the baling run between the sprockets 98 and the sprockets 87.

When the bale reaches a desired size which is as illustrated in FIG. 3, the operator has certain options. He may actuate the hydraulic cylinder 49 to tilt the baler rearwardly, and then actuate the hydraulic cylinder 62 to open the gate 14. Continuing operation of the fodder conveyor chains 70 rolls the finished bale off the rear of the baler, after which the gate 14 is returned to normal position, the baling machine is returned to the forwardly tilted position, and the tractor is again moved forward to start building a new bale.

A second option is to keep the tractor moving, pull out of the windrow, tilt the baler and dump the bale "on the fly," and return to the windrow when the rear gate is again closed. The remaining part of the windrow may be baled on the next run. This simplifies lining up the bales if they are to be picked up, and eliminates undesirable starting and stopping.

In addition to functioning to raise the front of the baler to discharge a bale, the hydraulic cylinder, together with the pivoted hitch means 13, provides the tractor operator with means for adjusting the height of the pickup means 15 to accommodate varying baling conditions. Some types of fodder are best handled with the fodder pickup tines 78 contacting the ground; while other fodder materials are better handled with the pickup tines in a slightly elevated position.

The baling apparatus is provided with a spiral twine wrapping means which forms no part of the present invention; and that twine wrapping means is manually started and then automatically driven to spirally wrap twine about the bale by continuing to rotate the bale after the front of the baler is elevated and before the gate is opened. This is preferably done in an intermediate baler position with the floor approximately horizontal.

The foregoing detailed description has been given for clearness of understanding only and no unnecessary limitations should be understood therefrom as modifications will be obvious to those skilled in the art.

I claim:

1. Apparatus for rolling large bales of fodder comprising, in combination:

a frame which has side frame members and supporting wheels;

a floor supported by said side frame members;

hitch means at the front of the frame adapted for attachment to the draw bar of a farm tractor by means of an upright pintle;

means for tilting said floor about a transverse pivot axis between a baling position in which the front of the floor is immediately adjacent the ground, and a discharge position in which the front of the floor is raised;

endless chain fodder conveyor means extending longitudinally of the floor, said conveyor means having front and rear sprockets and lugged chains with a rearwardly moving working run on top of the floor;

rotary fodder pickup means coaxial with the front sprockets, said pickup means having tines to feed fodder from the ground onto the fodder conveying means;

a pair of raddle guiding discs journalled on the side frame members to define the sides of a baling chamber, said discs having outer plates substantially the diameter of a finished bale and inwardly projecting narrow, concentric flanges near the periphery of the plates;

a rear discharge gate pivoted on the side frame members above the axes of the discs;

a plurality of parallel endless baling raddle chains connected by raddles extending transversely above the floor, said baling raddle chains being trained over upper and lower forward sprockets journalled on the frame and over upper and lower rearward sprockets journalled on the gate, and said raddles having their extremities supported on the disc flanges so the chains and raddles have a lower working run from the lower rearward sprocket, over the discs, and down the front part of the frame and define the rear, top and front of the baling chamber;

chain take-up means including movably mounted take-up sprockets engaging the baling chains and spring means biasing said movably mounted sprockets to minimize the length of the working run of said baling chains;

means for driving the fodder conveyor means and the fodder pickup means;

means for driving a forward sprocket to move the working run of the baling chains forwardly above the floor;

and means for swinging the rear discharge gate between a generally upright baling position and a generally horizontal elevated discharge position.

2. The apparatus of claim 1 in which the floor is fixedly mounted on the side frame members, the hitch means includes a rearward transverse pivot on the front of the frame, a draw bar mounted on said rearward pivot, a forward transverse pivot at the front of the draw bar, and a pintle yoke on said forward pivot, and in which the means for tilting the floor comprises a hydraulic cylinder and piston unit pivotally connected to the front of the frame and to said draw bar to turn the draw bar about said transverse pivots and thereby tilt the entire frame.

3. The apparatus of claim 2 which includes two slip tubes connected in tandem by a first universal joint, said slip tubes providing a driving connection through second and third universal joints between a power takeoff shaft on the tractor and an input shaft of a gear box mounted on the raar of the draw bar, a first link pivotally connected to one of the slip tubes near the universal joint and to the draw bar, and a second link pivotally connected to said first link and to the pintle yoke, said first and second links, said pintle yoke and said draw bar forming a four-bar linkage controlling the position of said slip tubes relative to the hitch means and relative to one another so as to maintain the angles through the universal joints within acceptable limits in all operating positions of the hitch means and the baler.

4. The apparatus of claim 3 in which the gear box has a transverse output shaft which is coaxial with the rearward transverse pivot, and endless drive means transmits power from said output shaft to drive the fodder conveyor and fodder pickup means, and to drive the baling raddle chains.

5. The apparatus of claim 1 in which the chain take-up means comprises a pair of guide channels at the sides of the frame, journal blocks slidably mounted in said guide channels, a transverse shaft rotatable in said journal blocks, the take-up sprockets being mounted on said transverse shaft, and the spring means biases said journal blocks in a direction to minimize the working run of the baling chains.

6. The apparatus of claim 5 in which each guide channel is located between two upper forward sprockets, the baling raddle chains are back-wrapped around the take-up sprockets between said two upper forward sprockets, the take-up sprockets have radial recesses in which the raddles are received, the journal blocks are biased to positions in which said baling raddle chains are in a U-shaped configuration toward the baling chamber from the lines of said forward sprockets, and the configuration of the baling raddle chains approaches a straight line between the lines of said forward sprockets as the journal blocks are moved by pressure from the bale, whereby there is a rapidly accelerating increase in chain tension during the last part of a baling cycle.

7. The apparatus of claim 1 in which the floor in baling position is tilted forwardly, and said floor in discharge position is tilted rearwardly with the rear of the floor very close to the ground, the transverse pivot axis about which the floor tilts being the axis of the supporting wheels.

8. The apparatus of claim 7 in which the hitch means includes a rearward transverse pivot on the front of the frame, a draw bar mounted on said rearward pivot, a forward transverse pivot at the front of the draw bar, and a pintle yoke on said forward pivot, and in which the means for tilting the frame comprises a hydraulic cylinder and piston unit pivotally connected to the front of the frame and to said draw bar to turn the draw bar about said transverse pivot.

9. The apparatus of claim 8 which includes a gear box on the rear of the draw bar, means for driving gears in said gear box from a tractor power takeoff, said gear box has a transverse output shaft which is coaxial with the rearward transverse pivot, and endless drive means transmits power from said output shaft to drive the fodder conveyor and fodder pickup means, and to drive the baling raddle chains.

10. The apparatus of claim 9 in which the means for driving gears in the gear box comprises a first slip tube operatively connected to the tractor power takeoff through a universal joint, a second slip tube operatively connected to the gears through a universal joint, an intertube universal joint operatively connecting said slip tubes in tandem, and which includes a first link pivotally connected to one of the slip tubes near said inter-tube universal joint and to the draw bar, and a second link pivotally connected to said first link and to the pintle yoke, said first and second links, said pintle yoke and said draw bar forming a four-bar linkage controlling the position of said slip tubes relative to the hitch means and relative to one another so as to maintain the angles through the universal joints within acceptable limits in all operating positions of the hitch means and the baler.

11. The apparatus of claim 10 in which the chain take-up means comprises a pair of guide channels at the sides of the frame, journal blocks slidably mounted in said guide channels, a transverse shaft rotatable in said journal blocks, the take-up sprockets being mounted on said transverse shaft, and the spring means biases said journal blocks in a direction to minimize the working run of the baling chains.

12. The apparatus of claim 11 in which each guide channel is located between two upper forward sprockets, the baling raddle chains are back-wrapped around the take-up sprockets between said two upper forward sprockets, the take-up sprockets have radial recesses in which the raddles are received, the journal blocks are biased to positions in which said baling raddle chains are in a U-shaped configuration toward the baling chamber from the lines of said forward sprockets, and the configuration of the baling raddle chains approaches a straight line between the lines of said forward sprockets as the journal blocks are moved by pressure from the bale, whereby there is a rapidly accelerating increase in chain tension during the last part of a baling cycle.

13. Apparatus for rolling large bales of fodder comprising, in combination:
a frame which has side frame members and supporting wheels;
a floor supported by said side frame members;
hitch means at the front of the frame adapted for attachment to the draw bar of a farm tractor by means of an upright pintle;
means for tilting said floor about a transverse pivot axis between a baling position in which the front of the floor is immediately adjacent the ground, and a discharge position in which the front of the floor is raised;
endless chain fodder conveyor means extending longitudinally of the floor, said conveyor means having front and rear sprockets and lugged chains with a rearwardly moving working run on top of the floor;
rotary fodder pickup means coaxial with the front sprockets, said pickup means having tines to feed fodder from the ground onto the fodder conveyor means;
a rear discharge gate pivoted on the side frame members;
a plurality of parallel endless baling raddle chains connected by raddles extending transversely above the floor, said baling raddle chains being trained over upper and lower forward sprockets journalled on the frame and over upper and lower rearward sprockets journalled on the gate, said chains and raddles having a lower working run from the lower rearward sprockets to the lower forward sprockets, above the floor, so as to define the rear, top and front of the baling chamber;
chain take-up means including movably mounted take-up sprockets engaging the baling chains and spring means biasing said movably mounted sprockets to minimize the length of the working run of said baling chains;
means for driving the fodder conveyor means and the fodder pickup means;
means for driving a forward sprocket to move the working run of the baling chains forwardly above the floor;
and means for swinging the rear discharge gate between a generally upright baling position and a generally horizontal elevated discharge position.

14. The apparatus of claim 13 in which the floor in baling position is tilted forwardly, and said floor in discharge position is tilted rearwardly with the rear of the floor very close to the ground, the transverse pivot axis about which the floor tilts being the axis of the supporting wheels.

15. The apparatus of claim 14 in which the floor is fixedly mounted on the side frame members, the hitch means includes a rearward transverse pivot on the front of the frame, a draw bar mounted on said rearward pivot, a forward transverse pivot at the front of the draw bar, and a pintle yoke on said forward pivot, and in which the means for tilting the floor comprises a hydraulic cylinder and piston unit pivotally connected to the front of the frame and to said draw bar to turn the draw bar about said transverse pivots and thereby tilt the entire frame.

16. The apparatus of claim 15 which includes a gear box on the rear of the draw bar, means for driving gears in said gear box from a tractor power takeoff, said gear box has a transverse output shaft which is coaxial with the rearward transverse pivot, and endless drive means transmits power from said output shaft to drive the fodder conveyor and fodder pickup means, and to drive the baling raddle chains.

17. The apparatus of claim 16 in which the means for driving gears in the gear box comprises a first slip tube operatively connected to the tractor power takeoff through a universal joint, a second slip tube operatively connected to the gears through a universal joint, an inter-tube universal joint operatively connecting said slip tubes in tandem, and which includes a first link pivotally connected to one of the slip tubes near said inter-tube universal joint and to the draw bar, and a second link pivotally connected to said first link and to the pintle yoke, said first and second links, said pintle yoke and said draw bar forming a four-bar linkage controlling the position of said slip tubes relative to the hitch means and relative to one another so as to maintain the angles through the universal joints within acceptable limits in all operating positions of the hitch means and the baler.

18. The apparatus of claim 17 in which the chain take-up means comprises a pair of guide channels at the sides of the frame, journal blocks slidably mounted in said guide channels, a transverse shaft rotatable in said journal blocks, the take-up sprockets being mounted on said transverse shaft, and the spring means biases said journal blocks in a direction to minimize the working run of the baling chains.

19. The apparatus of claim 18 in which each guide channel is located between two upper forward sprockets, the baling raddle chains are back-wrapped around the take-up sprockets between said two upper forward sprockets, the take-up sprockets have radial recesses in which the raddles are received, the journal blocks are biased to positions in which said baling raddle chains are in a U-shaped configuration toward the baling chamber from the lines of said forward sprockets, and the configuration of the baling raddle chains approaches a straight line between the lines of said forward sprockets as the journal blocks are moved by pressure from the bale, whereby there is a rapidly accelerating increase in chain tension during the last part of a baling cycle.

20. Apparatus for rolling large bales of fodder comprising, in combination:
 a frame with supporting wheels, said frame having a floor and side frame members;
 hitch means at the front of the frame adapted for attachment to the draw bar of a farm tractor by means of an upright pintle, said hitch means including a rearward transverse pivot on the front of the frame, a draw bar mounted on said rearward pivot, a forward transverse pivot at the front of the draw bar, and a pintle yoke on said forward pivot;
 a hydraulic cylinder and piston unit pivotally connected to the front of the frame and to said draw bar to turn the draw bar about said transverse pivots and thereby tilt said frame about a transverse pivot axis between a baling position in which the front of the floor is immediately adjacent the ground, and a discharge position in which the front of the floor is raised and the rear of the floor is nearer the ground;
 endless chain fodder conveyor means extending longitudinally of the floor, said conveyor means having front and rear sprockets and lugged chains with a rearwardly moving working run on top of the floor;
 rotary fodder pickup means at the front of the frame, said pickup means having tines to feed fodder from the ground onto the fodder conveyor means;
 a rear discharge gate pivoted on the side frame members;
 a plurality of parallel endless baling raddle chains connected by raddles extending transversely above the floor, said baling raddle chains being trained over upper and lower forward sprockets journalled on the frame and over upper and lower rearward sprockets journalled on the gate, said chains and raddles having a lower working run from the lower rearward sprockets to the lower forward sprockets, above the floor, so as to define the rear, top and front of the baling chamber;
 chain take-up means including movably mounted take-up sprockets engaging the baling chains and spring means biasing said movably mounted sprockets to minimize the length of the working run of said baling chains;
 means for driving the fodder conveyor means and the fodder pickup means;
 means for driving a forward sprocket to move the working run of the baling chains forwardly above the floor;
 and means for swinging the rear discharge gate between a generally upright baling position and a generally horizontal elevated discharge position.

21. The apparatus of claim 20 in which the floor in baling position is tilted forwardly, and said floor in discharge position is tilted rearwardly, the transverse pivot axis about which the floor tilts being the axis of the supporting wheels.

22. The apparatus of claim 21 which includes a gear box mounted on the rear of the hitch means, means for driving gears in said gear box from a tractor power takeoff, said gear box has a transverse output shaft which is coaxial with the rearward transverse pivot, and endless drive means transmits power from said output shaft to drive the fodder conveyor and fodder pickup means, and to drive the baling raddle chains.

23. The apparatus of claim 22 in which the means for driving gears in the gear box comprises a first slip tube operatively connected to the tractor power takeoff through a universal joint, a second slip tube operatively connected to the gears through a universal joint, an inter-tube universal joint operatively connecting said slip tubes in tandem, and which includes a first link pivotally connected to one of the slip tubes near said inter-tube universal joint and to the draw bar, and a second link pivotally connected to said first link and to the pintle yoke, said first and second links, said pintle yoke and said draw bar forming a four-bar linkage controlling the position of said slip tubes relative to the hitch means and relative to one another so as to maintain the angles through the universal joints within acceptable limits in all operating positions of the hitch means and the baler.

24. Apparatus for rolling large bales of fodder comprising, in combination:
 a frame which has side frame members and supporting wheels;
 a floor supported by said side frame members;
 hitch means at the front of the frame adapted for attachment to the draw bar of a farm tractor by means of an upright pintle;
 endless chain fodder conveyor means extending longitudinally of the floor, said conveyor means having front and rear sprockets and lugged chains with a rearwardly moving working run on top of the floor;
 rotary fodder pickup means at the front of the frame, said pickup means having tines to feed fodder from the ground onto the fodder conveyor means;
 a rear discharge gate pivoted on the side frame members;
 a plurality of parallel endless baling raddle chains connected by raddles extending transversely above the floor, said baling raddle chains being trained over upper and lower forward sprockets journalled on the frame and over upper and lower rearward sprockets journalled on the gate, said chains and raddles having a lower working run from the lower rearward sprockets to the lower forward sprockets, above the floor, so as to define the rear, top and front of the baling chamber;
 guide means initially supporting the working run of the baling raddle chains and raddles above the floor, said raddle chains and raddles being lifted off said guide means by the pressure of a forming bale;
 means for driving the fodder conveyor means and the fodder pickup means;

means for driving a forward sprocket to move the working run of the baling chains forwardly above the floor;

chain take-up means comprising a pair of guide channels at the sides of the frame, journal blocks slidably mounted in said guide channels, a transverse shaft rotatable in said journal blocks, the take-up sprockets being mounted on said transverse shaft, and spring means biasing said journal blocks in a direction to minimize the working run of the baling chains;

and means for swinging the rear discharge gate between a generally upright baling position and a generally horizontal elevated discharge position.

25. The apparatus of claim 24 in which each guide channel is located between two upper forward sprockets, the baling raddle chains are back-wrapped around the take-up sprockets between said two upper forward sprockets, the take-up sprockets have radial recesses in which the raddles are received, the journal blocks are biased to positions in which said baling raddle chains are in a U-shaped configuration toward the baling chamber from the lines of said forward sprockets, and the configuration of the baling raddle chains approaches a straight line between the lines of said forward sprockets as the journal blocks are moved by pressure from the bale, whereby there is a rapidly accelerating increase in chain tension during the last part of a baling cycle.

* * * * *